(12) United States Patent
Cordara et al.

(10) Patent No.: US 8,625,678 B2
(45) Date of Patent: Jan. 7, 2014

(54) METHOD FOR SCALABLE VIDEO CODING ON A PLURALITY OF SPACE RESOLUTION LEVELS

(75) Inventors: Giovanni Cordara, Turin (IT); Gianluca Francini, Turin (IT); Skjalg Lepsoy, Turin (IT)

(73) Assignee: Telecom Italia S.p.A., Milan (IT)

( * ) Notice: Subject to any disclaimer, the term of this patent is extended or adjusted under 35 U.S.C. 154(b) by 837 days.

(21) Appl. No.: 11/992,741

(22) PCT Filed: Sep. 29, 2005

(86) PCT No.: PCT/IB2005/002920
§ 371 (c)(1),
(2), (4) Date: May 22, 2009

(87) PCT Pub. No.: WO2007/036759
PCT Pub. Date: Apr. 5, 2007

(65) Prior Publication Data
US 2009/0304090 A1   Dec. 10, 2009

(51) Int. Cl.
*H04N 7/12* (2006.01)
(52) U.S. Cl.
USPC .................................................. 375/240.26
(58) Field of Classification Search
USPC ........................................ 375/240.01, 240.21
IPC ........................................................ H04N 7/12
See application file for complete search history.

(56) References Cited

U.S. PATENT DOCUMENTS 4,853,779 A * 8/1989 Hammer et al. ......... 375/240.22
5,241,608 A   8/1993 Fogel
5,680,487 A   10/1997 Markandey
6,728,317 B1 * 4/2004 Demos ..................... 375/240.21
2005/0190979 A1 * 9/2005 Li et al. ......................... 382/240

FOREIGN PATENT DOCUMENTS

EP           0 644 695 A2       3/1995

OTHER PUBLICATIONS

Horn et al., "Determining Optical Flow", Massachusetts Institute of Technology Artificial Intelligence Laboratory, No. 17, pp. 1-27, (1980).
Giaccone et al.; "Spatio-Temporal Approaches to Computation of Optical Flow", Proceedings of the British Machine Vision Conference, 10 pages, (1997).

(Continued)

*Primary Examiner* — David Czekaj
*Assistant Examiner* — Tracy Li
(74) *Attorney, Agent, or Firm* — Finnegan, Henderson, Farabow, Garrett & Dunner, L.L.P.

(57) ABSTRACT

A method for estimating motion for the scalable video coding, includes the step of estimating the motion field of a sequence of photograms which can be represented with a plurality of space resolution levels including computing the motion field for the minimum resolution level and, until the maximum resolution level is reached, repeating the steps of: rising by one resolution level; extracting the photograms for such resolution level; and computing the motion field for such resolution level. The motion field is computed through an optical flow equation which contains, for every higher level than the minimum resolution level, a regularization factor between levels which points out the difference between the solution for the considered level and the solution for the immediately lower resolution level. A more or less high value of the regularization factor implies more or less relevant changes of the component at the considered resolution during the following process iterations.

17 Claims, 3 Drawing Sheets

(56) References Cited

OTHER PUBLICATIONS

Moulin et al.; "Multiscale Modeling and Estimation of Motion Fields for Video Coding", IEEE Transactions of Image Processing, vol. 6, No. 12, pp. 1606-1620, (1997).

Simoncelli; "Bayesian Multi-Scale Differential Optical Flow", Handbook of Computer Vision and Applications, Academic Press, pp. 397-422, 1999.

Taubman, "SVC Technical Contribution: Overview of Recent Technology Developments at UNSW", ISO/IEC JTC1/SC29/WG11/M10868, pp. 1-22, (2004).

Dipanda et al.; "Multiresolution Motion Estimation with Discontinuities Preservation Using MRF and Determination of the Regularization Hyperparameter" Part of the IS&T SPIE Conference on Capture, Analysis and Display of Image Sequences, San Jose California, XP-002385365, vol. 3642, pp. 44-55, (1999).

Baaziz et al.; "Multiconstraint Weiner-Based Motion Compensation Using Wavelet Pyramids", IEEE Transactions on Image Processing, vol. 3, No. 5, pp. 688-692, (1994).

Castellano et al.; "Moving Target Detection in Infrared Imagery Using a Regularized CDWT Optical Flow", Computer Vision Beyond the Visible Spectrum: Methods and Applications, (CVBVS '99) Proceedings IEEE Workshop, 10 pages, (1999).

* cited by examiner

METHOD FOR SCALABLE VIDEO CODING ON A PLURALITY OF SPACE RESOLUTION LEVELS

CROSS REFERENCE TO RELATED APPLICATION

This application is a national phase application based on PCT/IB2005/002920, filed Sep. 29, 2005, the content of which is incorporated herein by reference.

BACKGROUND OF THE INVENTION

1. Technical Field

The present invention deals with a method for scalable video coding.

Video coding is a complex procedure, composed of a chain of different operations; motion estimation, space transform, quantization, entropy coding. The first operation, motion estimation, plays a major role in the process, and its efficiency deeply affects the obtainable compression ratio. During such step, in fact, a prediction of the contents of a photogram is computed starting from the adjacent ones, exploiting the high similarity which usually distinguishes subsequent photograms.

2. Description of the Related Art

Herein below, the term "reference photogram" means an already processed photogram so that it can be reconstructed by the decoder. The term "current photogram" means the photogram to be coded, namely the processing object. The reference photogram is modified in order to approximate the current photogram.

The similarity between subsequent photograms can be expressed through "distortions". The coded flow is composed of the differences between current photogram prediction and current photogram itself, and of additional information which allow the decoder to obtain the same prediction to obtain the perfect reconstruction. In such a way, the coded information energy is minimised, maximising the compression factor.

In traditional standards of the hybrid type (for ex. MPEG-2, H.264/AVC) the most used motion estimation technique is the so-called "block matching": the whole current photogram is divided into small blocks with variable size and each one of them is associated, on the reference photogram, with the block having the most similar contents and which minimises, therefore, the difference energy. The two small blocks (one on the current photogram and one on the reference photogram) are therefore presumably an identification of the same image portion; such image portion is often subjected to an offset when passing from a photogram to the following one due either to a movement of filmed objects or to the camera movement. Therefore, it is possible to associate every small block of the current image with a two-dimensional vector, which do represents the offset to which such small block has been subjected with respect to the previous photogram. Such two-dimensional vector which identifies the offset is called "motion vector" (MV).

In the coded flow, consequently, reference photograms, MVs and differences between individual blocks and their predictions are inserted.

The use of block matching introduces some visual artefacts on decoded flows with a high compression ratio, but appears as the most efficient method for computing the motion estimation in hybrid coders (namely in coders including the prediction for compensating movement and space compression).

With the advent of new video coding technologies, based on different transforms from the traditional DCT (Discrete Cosine Transform), such as the "wavelet" transform, an efficiency loss is detected due to the use of block matching as motion estimation technique. The wavelet transform, in fact, contrary to DCT, which operates in blocks, is applied on the whole photogram, and the block matching technique therefore introduces discontinuities on small block edges which, in the transformed domain, give origin to high-frequency components. Such components highly limit performances during the quantization step. Therefore, a need arises for a new type of motion representation.

A motion estimating device is known which is based on an alternative approach to block matching, the so-called "optical flow", which computes the spot distortion of the reference photogram for determining a current photogram prediction without incurring in a block use. The optical flow technique is described for example in B. Horn, B. Schunck, "Determining optical flow", Artificial Intelligence, no. 17, pp. 185-203, 1981. The optical flow is computed by solving a system of linear equations, whose coefficients are obtained from space and time derivatives of the current photogram, namely from spot differences between adjacent and/or subsequent pixels in time. The solution is a set of two-dimensional vectors, one for every photogram pixel, called "motion field".

The motion field produced by the optical flow can be determined so that it is regular, or "smooth", due to the addition of regularization terms in the system of linear equations. The smooth field gives origin to residuals which do not show the typical discontinuities of block matching and are adapted to be decomposed with the wavelet transform.

There are optical flow embodiments for which the motion fields are computed iteratively, so that each iteration determines a field which is inserted as term in a sum of fields. The final sum is the motion field. The article of P. Giaccone, G. Jones, "Spatio-temporal approaches to the computation of optical flow", Proceedings of the British Machine Vision Conference, 1997, describes for example the use of the optical flow technique with a particular solution for building the first motion field, in which the first motion estimation is based on identification and tracking of some salient points.

It is known to apply multi-resolution motion estimation techniques through optical flow in video coding contexts, as described for example in Moulin: P. Moulin, R. Krishnamurthy and J. Woods, "Multiscale Modeling and Estimation of Motion Fields for Video Coding", IEEE Transactions on Image Processing, vol. 6, no. 12, pp. 1606-1620, December 1996.

There are in particular motion estimation embodiments through optical flow which use a "coarse-to-fine" procedure, namely a multi-resolution one. Such techniques provide for the construction of motion fields as a sum. Every term of such sum corresponds to a level of a pyramid containing different space resolutions. Purpose of these procedures is overcoming the difficulties encountered by optical flow algorithms in the wide motion computation, namely in determining offsets which exceed a certain number of pixels.

In practice, such techniques operate as follows. The firs terms is composed of the motion field estimated for photograms at the lowest resolution level. The following terms are produced in the following way:

1. One goes up by one resolution level and photograms at such level are considered.
2. A motion field is created expanding through interpolation and scaling the previously-computed field.
3. The reference photogram is deformed with the field created thereby.

4. The motion field is computed which exists between deformed photogram and current photogram. Such field will be a term of this sum, and will be added to what has already been computed.

5. If the maximum resolution level has not been reached, the process is repeated from step 1.

In such technique, therefore, the computed motion fields for lower levels are used as terms in the final field.

The document by Eero P. Simoncelli: "Bayesian multiscale differential optical flow", in Handbook of Computer Vision and Applications, eds. B. Jähne, H. Haussecker, and P. Geissler, Academic Press, 1999 describes for example a multi-resolution optical flow arrangement, comprising the use of an algorithm which is able to manage the uncertainty belonging to the motion estimation at multiple levels. The motion field at a certain level is modelled as the sum of motion deriving from below levels and a stochastic component. Other documents related to multi-resolution optical flow motion estimation are U.S. Pat. No. 5,680,487 and U.S. Pat. No. 5,241,608.

The optical flow can be applied in a different environment with respect to traditional coding, in particular in a context of Scalable Video Coding (SVC), also called "level" coding. The SVC technique objective is, starting from a single coded flow, to perform a single coding, originating a bitstream from which it is possible to obtain flows with multiple qualities. In fact, from such bitstream it is possible to extract a new bitstream related to a video flow with desired resolution (chosen from a set of possible resolutions), taking into account the space, time (in terms of "frame rate") and quality (in terms of "bit rate") dimensions. Arrangements using both hybrid technologies and wavelet-based approaches are known.

The scalable coding is important, for example, for transmitting on noisy channels: in fact, it is possible to protect the most important levels (the basic levels) by transmitting them on channels with better performances. The scalable coding is very useful also on channels with variable bit-rate: when the band is reduced, the less important layers are not transmitted. Another useful application of the scalability consists in the progressive transmission, namely a user can revise a video preview, coded only with basic levels, for example in order to perform a choice in a database; once the decision has been taken, he will be able to receive the video at the best quality.

In scalable coders, in case of space scalability, the motion estimation step is highly complicated and performances are strongly affected by such step. The optimum prediction for lower resolutions, in fact, is not always given by scaling of motion vectors computed at full resolution, due to the loss of details and the appearance of aliasing. The optimum solution, for the motion field associated with each space resolution, cannot be derived from other resolutions. It is therefore impossible to determine the optimum motion for all resolutions by exclusively computing it in a limited set thereof. However, the motion representation inserted in the bitstream must be unique, to avoid an excessive occupation of bits dedicated to the motion field.

It is thereby necessary to find the best compromise able to optimise performances for all affected resolutions.

There are approaches, based on a motion estimation of the block matching type, which provide for the computation of the motion field for each of the provided resolutions, and represent the motion information univocally by inserting in the coded flow a compromise which is able to keep good performances for each scalability level. The following approaches differ depending on the computation modes of the compromise:

In EP0644695A2, starting from the estimation computed on a basic layer and on an enhancement layer, the final motion field computation is performed, by using weight functions guided by the estimation validity (in terms of residual energy) for each level.

D. Taubman, N. Mehrseresht, R. Leung, "SVC Technical Contribution: Overview of recent technology developments at UNSW", ISO/IEC JTC1/SC29/WG11/M10868, 2004" describes an adaptive process, which assigns a variable weight, depending on the estimation validity, to motion information coming from high-frequency bands computed during space filtering.

The Applicant has observed that, in spite the above documents describe motion estimation algorithms based on multi-resolution analysis with the use of a compromise for different scalability levels, motion estimation always occurs by applying the block matching. The block matching, however, has difficulties if applied to the scalable coding, since it is not known how to realise motion fields which are able to faithfully represent different space resolutions.

BRIEF DESCRIPTION OF THE INVENTION

The Applicant has dealt with the problem of adapting the optical flow techniques to a scalable coding scenario, in particular of modifying the optical flow algorithmic process in order to improve performances of a motion estimating device in case of space scalability in a multi-resolution context for scalable video coding.

The Applicant has found that, by performing the optical flow computation for the lowest space resolution, followed by a similar process for greater resolutions with the addition of a constraint which measures the similarity between the solution for the considered level and the solution for the below level at a lower resolution, it is possible to obtain an improvement of estimating device performances.

When decoding, motion fields for different resolutions are obtained by the field associated with the highest resolution (computed when coding through the method described below) by applying a bench of filters of the wavelet type (Discrete Wavelet Transform—DWT).

The above constraint, realised as regularization term, penalises solutions which differ (in particular in the low-pass component) from the motion field already computed for the lower resolution. The regularization term quantifies the difference between the field to be computed and the already computed field for the level below. For such purpose, a low-pass wavelet filtering is applied to the field to be computed, followed by a sub-sampling for reducing the resolution.

The influence exerted by regularization can then be set through a factor, called "regularization factor", which determines the similarity between levels. A high regularization factor makes the component of a certain resolution scarcely change during the following iterations of the herein described process. If instead the regularization factor is low, then the component of a certain resolution is subjected to changes during following iterations, especially if details appeared at upper levels move differently from those which can be seen at lower levels.

It is therefore possible to make the solution more or less constrained to some space levels, in order to maximise performances depending on scene contents and scalability needs.

Fields computed for lower levels are used only as parts of the optimisation criteria, and not as terms in the final field. When decoding, to obtain a motion field which can be applied at a certain resolution, it is enough to perform a low-pass wavelet filtering to remove high-frequency components and then sub-sample the result.

The technique of the present invention therefore adds innovative regularization terms in multi-resolution scalable video coding.

The end result of this procedure is composed of the motion field computed at the highest level. It contains in itself, as components, approximations to optimum motion fields (in the optical flow sense) for every resolution level. The technique of the invention therefore allows distributing the error belonging to multi-resolution fields among the various used resolutions.

The proposed solution, studied for video coders of the wavelet type, can also be adopted within a hybrid coder.

According to a first aspect thereof, the present invention therefore relates to a method for motion estimation for scalable video coding, comprising the step of estimating the motion field of a sequence of photograms which can be represented with a plurality of space resolution levels included between a minimum resolution level and a maximum resolution level, wherein the step of estimating the motion field comprises the step of computing the motion field for each one of the space resolution levels by the minimization of a function, wherein, for each level which is different from the minimum space resolution level, said function comprises a regularization term between levels which is indicative of the difference between the solution of the minimisation for the considered level and the solution of the minimisation for the space resolution level which is immediately lower than the considered level. The expression "solution of the minimisation" means the solution which allows obtaining the minimum of the considered function.

Preferably, the above function can be expressed through an optical flow equation. In other words, the motion field is computed through an optical flow equation which, for levels different from the minimum space resolution level, comprises the above regularization term between levels. Such term instead is absent for the minimum resolution level.

Preferably, the step of computing the motion field for every level which is different from the minimum space resolution level is performed sequentially passing from minimum space resolution level to maximum space resolution level.

For each space resolution level, the motion field comprises an initial motion field and an incremental motion field and the steps of computing the motion field preferably comprise computing the incremental motion field and adding the incremental motion field to the initial motion field.

For a generic space resolution level of K−m order different from the minimum space resolution level, the regularization term between levels can be expressed as:

$$F_3(q_{K-m}) = \|E(q_{K-m} + p_{K-m}^0) - p_{K-m-1}\|^2,$$

where E is a filtering and sub-sampling operator, $p^0$ is the initial motion field and q is the incremental motion field; moreover, the incremental motion field q in a generic point with coordinates x, y being suitable to be expressed as $$q(x, y) = \begin{bmatrix} \delta u(x, y) \\ \delta v(x, y) \end{bmatrix},$$

where δu and δv are the horizontal and vertical components of the incremental motion field.

The filtering and sub-sampling operator E is preferably a low-pass component of a wavelet transform.

For each level different from the minimum space resolution level, minimisation can preferably be expressed as:

$$q = \arg\min\{F_1(q) + \lambda F_2(q) + \mu F_3(q)\}$$

where $F_1(q)$ is a term designating the approximation error, $F_2(q)$ is a term designating the motion field regularity and λ and μ are two regularization factors.

Instead, for the minimum space resolution level, minimisation can preferably be expressed as:

$$q = \arg\min\{F_1(q) + \lambda F_2(q)\}.$$

Moreover, taking into account two photograms $g_t$ and $g_{t+1}$ at subsequent instants t and t+1 on the generic resolution level K−m, the term designating the approximation error can be expressed as:

$$F_1(q) = \|A_{K-m}q - (M(g_t, u_0, v_0) - g_{t+1})\|^2, \text{ where:}$$

$u_0$ and $v_0$ are the horizontal and vertical components of the initial motion field, $A_{k-m}$ is a matrix composed of two diagonal sub-matrixes containing the space derivatives of photogram $g_{t+1}$, expressed as $A_{K-m} = [\text{diag}(g_{t+1}^{(x)}) \text{diag}(g_{t+1}^{(x)})]$, and M is a motion operator adapted to distort a generic photogram g in the following way:

$$M(g, u, v)(x, y) = g(x - u(x, y), y - v(x, y)).$$

The term designating the motion field regularity can be expressed as $F_2(q) = \|Hq\|^2$, where H is a second derivative operator which can be expressed as:

$$H = \begin{bmatrix} \frac{d^2}{dx^2} & \\ \frac{d^2}{dy^2} & \\ & \frac{d^2}{dx^2} \\ & \frac{d^2}{dy^2} \end{bmatrix}$$

Before the steps of computing the motion fields, the method preferably comprises the further step of building photograms at different space resolution levels starting from photograms at maximum space resolution level.

Moreover, for each space resolution level, the step of building the photograms preferably comprises filtering and sub-sampling the photograms at maximum space resolution level, such step of filtering and sub-sampling being performed a number of times equal to the number of levels which separate the space resolution level from the maximum space resolution level.

The step of filtering and sub-sampling preferably comprises the following steps:
low-pass filtering along the rows;
sub-sampling the columns;
low-pass filtering along the columns; and
sub-sampling the rows.

The present invention further relates to a method for transmitting coded video images, comprising the steps of coding a video image according to the above-described method, transmitting the coded image, receiving the coded image and decoding the received coded image.

Preferably, the step of decoding comprises applying to said coded video image at least one transform of the wavelet type to obtain a sequence of photograms at a desired resolution level.

The above method is adapted to be performed (as sequence of steps) as program by a processor. The present invention therefore also relates to a processor program which can be directly loaded into a memory of a data processing system and is adapted to implement, when performed, the previously described method. The invention finally deals with a system comprising means for performing the steps of the previously described method.

BRIEF DESCRIPTION OF THE FIGURES

The present invention will be described herein below with reference to the enclosed figures, which show a non-limiting embodiment thereof. In particular.

DETAILED DESCRIPTION OF THE INVENTION

Figure 1:
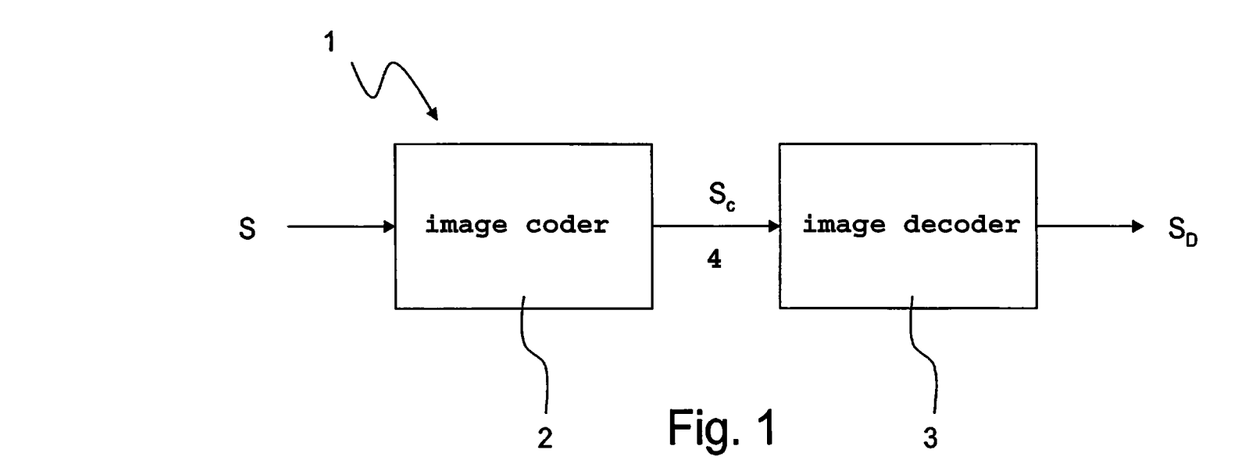
FIG. 1 shows as an example a system for coding and decoding video images.

With reference to FIG. 1, 1 designates a system for transmitting video signals, comprising an image coder 2 and an image decoder 3. The image coder 2 is adapted to receive a video signal S generated by a video filming device (such as a digital video camera), to code the signal S for generating a corresponding coded video signal $S_c$, and finally to transmit such coded signal on a transmitting medium 4 of a known type, for example an optical fiber connection. The decoder 3 is adapted to receive the coded signal $S_c$ and to decode such signal to extract a signal $S_D$, similar but not necessarily equal to signal S.

The signal S is coded so that it can be decoded on a space resolution level chosen among a set of possible resolution levels.

In the following description, therefore, the presence of a multi-resolution pyramid will be assumed for representing photograms and motion fields having M+1 levels, in which the highest level has index K and the lowest has index K−M.

Figure 2:
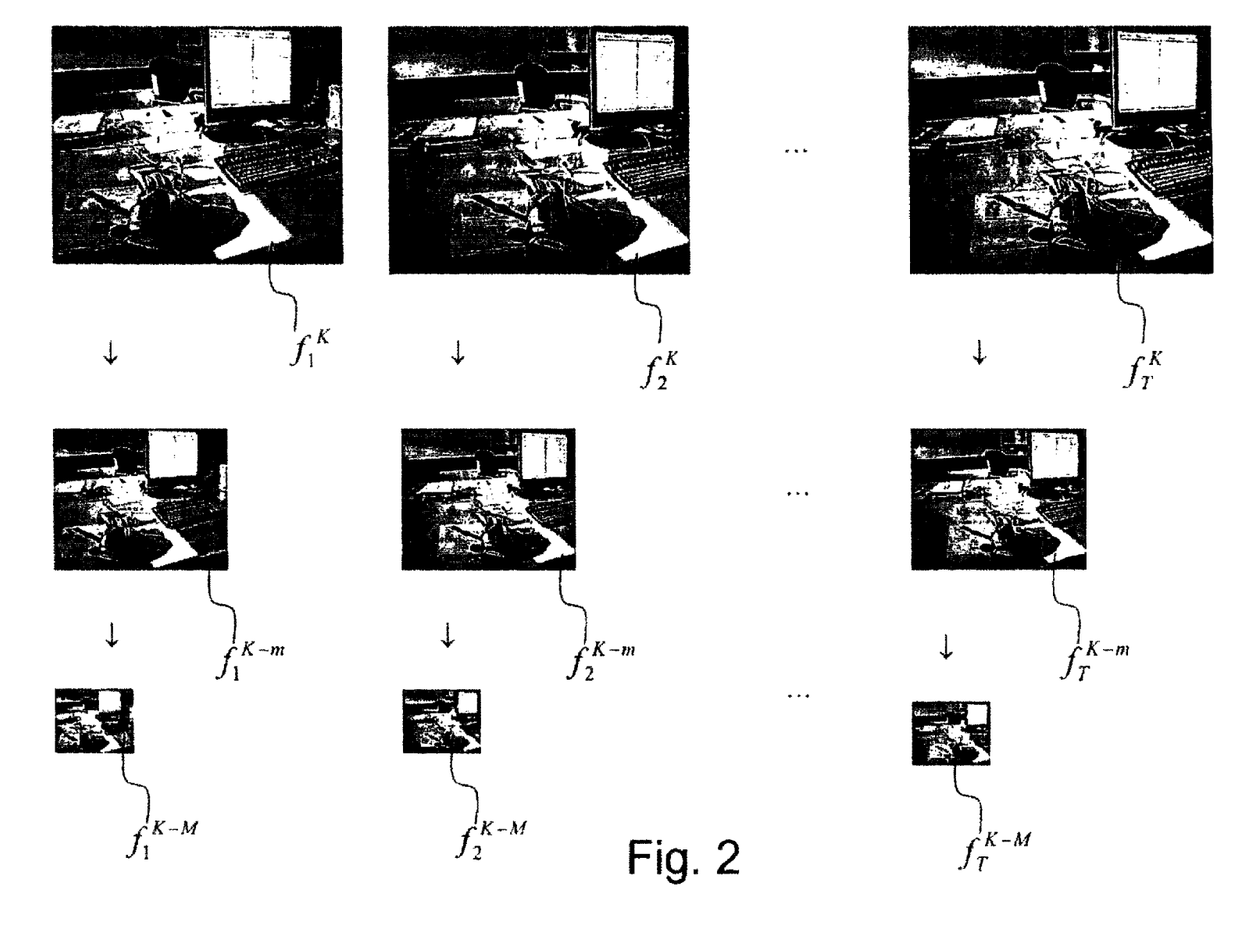
FIG. 2 shows sequences of video images on many resolution levels, to which the coding technique of the present invention is applied.

FIG. 2 shows three sequences of photograms at times t=1, t=2 . . . t=T, related to the same video but corresponding to three different resolution levels K, K−m and K−M. In particular, the first sequence of photograms $f_1^K, f_2^K, \ldots, f_T^K$ is related to maximum resolution (level K), the second sequence of photograms $f_1^{K-m}, f_2^{K-m}, \ldots, f_T^{K-m}$ is related to an intermediate resolution (level K−m) and the third sequence of photograms $f_1^{K-M}, f_2^{K-M}, \ldots, f_T^{K-M}$ is related to the minimum resolution (level K−M).

Figure 3:
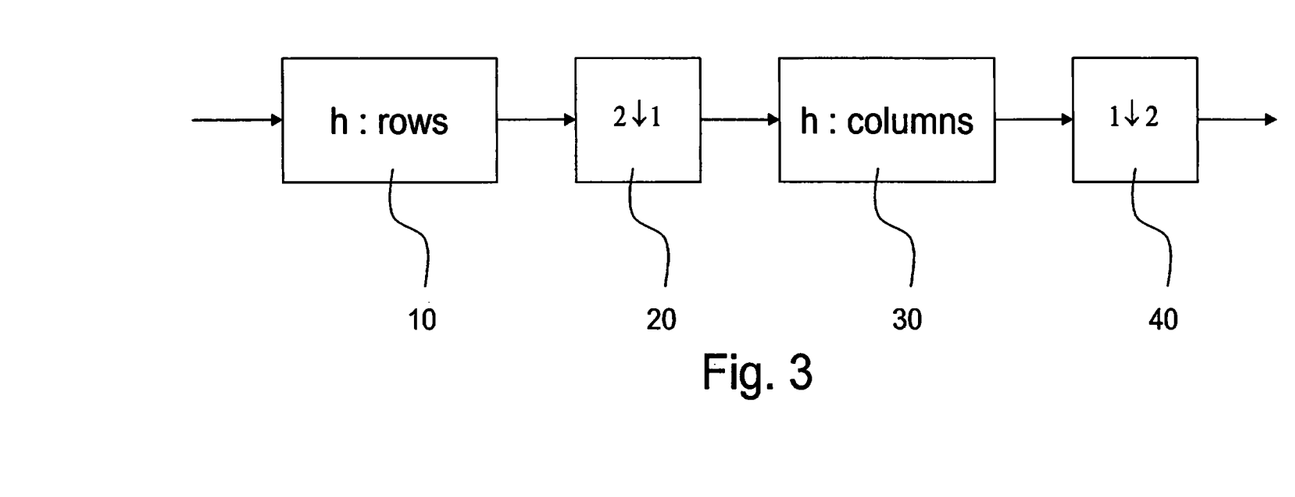
FIG. 3 shows filtering and sub-sampling steps included in the coding method of the present invention.

Upon receiving the uncoded video signal, comprising the sequence of photograms at maximum resolution level, the coder 2 performs the photogram construction at lower resolution levels. As shown in the flow diagram in FIG. 3, in order to build a photogram at a resolution of a lower level than the maximum resolution, the following sequence of operations is applied to the photogram at maximum resolution:

low-pass filtering along rows (step 10);
sub-sampling of columns (step 20);
low-pass filtering along columns (step 30); and
sub-sampling of rows (step 40).

This sequence of operations will be designated by letter B.

In order to build a photogram at a resolution of m levels lower than the maximum one, the above cascade of operations is applied m times. This operation, designated as $B^m$, is equivalent to the computation of the corresponding low-pass component of a discrete wavelet transform (DWT) for two-dimensional images. Then a photogram at time t and at level K−m (namely m levels below the maximum one) is obtained from the corresponding photogram at time t and at maximum level K through the relationship:

$$f_t^{K-m} = B^m f_t^K. \tag{1}$$

Following the construction of photograms at different levels, the motion field computation is performed at different levels. In the present invention, the motion field is obtained when coding through an iterative procedure. Such procedure first computes a motion field at the lowest resolution by minimising a function of the optical flow type, in order then to compute motion fields for greater and greater resolutions, rising along the pyramid of resolutions till the greatest one is reached, for which the final motion field will be computed.

At all other resolutions, the motion field is computed by minimising a cost function, in which a term represents the similarity between solution to be computed and already obtained solution for the level below. Minimising can be obtained by solving a system of equations.

Let us assume a generic resolution K−m and a generic time instant t. The two photograms being taken into account, related to such resolution at time t and at time t+1, are $g_t = f_t^{K-m}$ and $g_{t+1} = f_{t+1}^{K-m}$.

According to the optical flow technique, a matrix is built which contains the first space derivatives with respect to Cartesian coordinates x and y on two diagonals, and which is equal to zero in the other elements.

$$A_{K-m} = [\mathrm{diag}(g_{t+1}^{(x)}) \mathrm{diag}(g_{t+1}^{(y)})]. \tag{2}$$

The optical flow is initialised with horizontal $u_0(x,y)$ and vertical $v_0(x,y)$ motion fields, assuming in such a way that the pixel in (x,y) is moved by a vector $$p^0(x, y) = \begin{bmatrix} u_0(x, y) \\ v_0(x, y) \end{bmatrix} \tag{3}$$

between one photogram and the other.

The first term of the function to be minimised for solving the optical flow is:

$$F_1(q) = \|A_{K-m} q - (M(g_t, u_0, v_0) - g_{t+1})\|^2, \tag{4}$$

where variable q is an incremental motion field $$q(x, y) = \begin{bmatrix} \delta u(x, y) \\ \delta v(x, y) \end{bmatrix},$$

to be added to the initial one and M is a motion operator defined as regards initialisation and adapted to distort a photogram g according to motion fields u and v:

$$M(g, u, v)(x, y) = g(x - u(x, y), y - v(x, y)) \tag{5}$$

(with necessary modifications for fields u and v containing non-integer numbers and for a movement near to photogram edges).

Depending on what has been said above, the motion field p can therefore be expressed as $p = q + p^0$, namely as the sum of an initial term and an incremental term.

The above term $F_1(q)$ is a term designating the approximation error.

The first term of the optical flow does not determine the motion field univocally. Following the classic formulation by Horn and Schunck, it is necessary to add a term equal to the energy of the second derivative of the motion fields. The derivatives are expressed with an operator H equal to:

$$H = \begin{bmatrix} \frac{d^2}{dx^2} & & \\ \frac{d^2}{dy^2} & & \\ & \frac{d^2}{dx^2} & \\ & \frac{d^2}{dy^2} & \end{bmatrix}, \quad (6)$$

and the energy of the second derivative of the motion field becomes:

$$F_2(q) = \|Hq\|^2. \quad (7)$$

The second term $F_2$ represents, with a suitable regularization factor, the motion field regularity (namely the detail "poorness").

According to the present invention, at all resolution levels, apart from the lowest one, a third term $F_3$ is added to the two classic terms $F_1$ and $F_2$ of the function to be minimised. The term $F_1$ is used for keeping the similarity between the field that has to be estimated (at space resolution level K−m) and the previously computed field (at level K−m−1). To quantify such similarity the difference between the field at lower resolution (level K−m−1) and the low-pass component of the current field (at level K−m) is considered.

The low-pass component can be expressed through operator B as $$\begin{bmatrix} B & \\ & B \end{bmatrix} p_{K-m} = E p_{K-m} = E(q + p_{K-m}^0), \quad (8)$$

where operator E filters and sub-samples both the horizontal and the vertical fields. The operation is performed on the field composed of the initial one $p^0$ and the incremental one q to be computed.

In this way, the third term is $$F_3(q) = \|E(q + p_{K-m}^0) - p_{K-m-1}\|^2. \quad (9)$$

Such third term is, with a suitable regularization factor, the constraint inherited by the resolution below. In other words, the third term is an regularization term between levels.

From the three terms $F_1$, $F_2$ and $F_3$, it is possible to obtain the final motion field, according to the algorithm described below.

At the lowest resolution, the motion field $$p_{K-M} = q + p_{K-M}^0 \quad (10)$$

is computed, where $p_{K-M}^0$ is the initial field and q the incremental field. In turn, q can be expressed through the following (optical flow) equation:

$$q = \arg\min_{q \in P_{K-M}} \{F_1(q) + \lambda F_2(q)\}, \quad (11)$$

and λ is a regularization factor. The constraint $q \in P_{K-M}$ shows that the solution is at resolution level K−M.

At all resolutions greater that the lowest one, namely the generic level K−m, the motion field is computed as $$P_{K-m} = q + p_{K-m}^0 \quad (12)$$

where $p_{K-m}^0$ is the initial field and q the incremental field. In turn, q can be expressed through the following (optical flow) function:

$$q = \arg\min_{q \in P_{K-m}} \{F_1(q) + \lambda F_2(q) + \mu F_3(q)\}, \quad (13)$$

and λ and μ are regularization factors. The constraint $q \in P_{K-m}$ shows that the solution can be found at resolution level K−m.

The three terms $F_1(q)$, $F_2(q)$ and $F_3(q)$ of the sum of equation (13) respectively represent approximation error, motion field regularity and constraint inherited by the resolution below. If factor λ is high, regularity is given priority, namely the low content of details, for the resulting motion field. If factor μ is high, priority is given to the similarity which the resulting motion field has with respect to the motion field computed for the lower resolution.

Equation (13) is solved through normal equations $$\begin{bmatrix} A_{K-m} \\ \lambda H \\ \mu E \end{bmatrix}^T \begin{bmatrix} A_{K-m} \\ \lambda H \\ \mu E \end{bmatrix} q = \begin{bmatrix} A_{K-m} \\ \lambda H \\ \mu E \end{bmatrix}^T \begin{bmatrix} M(g_t, u_0, v_0) - g_{t+1} \\ 0 \\ \mu(p_{K-m-1} - E p_{K-m}^0) \end{bmatrix}. \quad (14)$$

Figure 4:
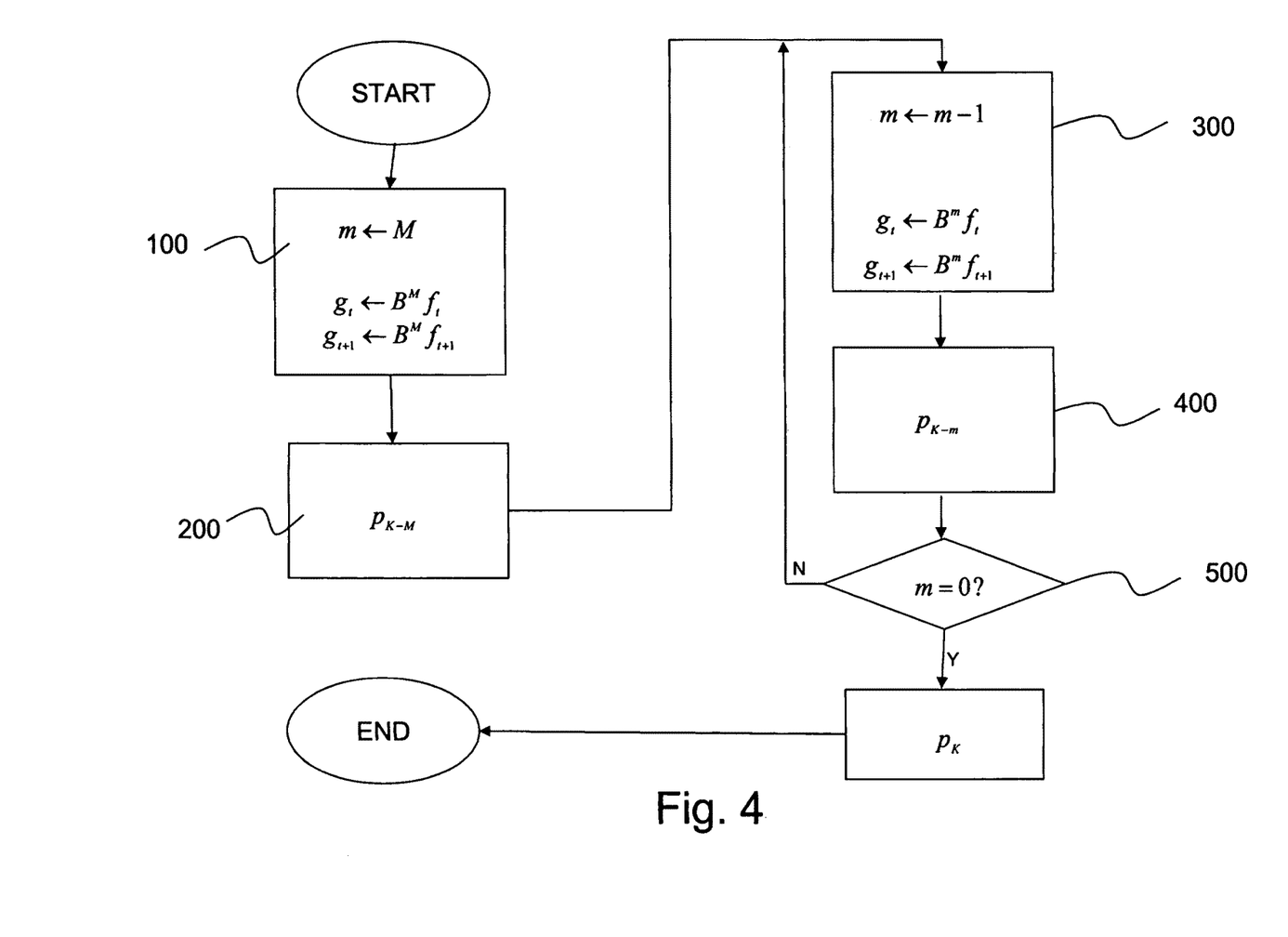
FIG. 4 shows a flow diagram related to the steps of the method of the present invention.

The motion field computation will be described below with reference to the flow diagram in FIG. 4.

In a first step (block 100) variable m is initialised at M in order to initialise the resolution level K−m at the lowest level K−M. On level K−M two photograms $f_t$ and $f_{t+1}$ are considered respectively at time t and at time t+1, and the respective photograms $g_t = f_t^{K-M}$ and $g_{t+1} = f_{t+1}^{K-M}$ are extracted.

Motion field $p_{K-M}$ is then computed (block 200) minimising the function which can be expressed according to equations (10) and (11).

One level is then risen, going up to level m−1, and photograms are extracted for the new resolution level (block 300).

Motion field $p_{K-m}$ is then computed (block 400) minimising the function which can be expressed through equations (12) and (13) (block 400).

It is then checked whether the highest level (m=0) has been reached (block 500). If such level has been reached, the procedure ends. If such level has still not been reached, the procedure restarts from block 300 rising by a further level.

At the end of the procedure, the final motion field $p_k$ is obtained.

The invention claimed is:

1. A method for a scalable video coding, comprising:
   estimating a motion field (p) of a sequence of photograms ($f_1, f_2, \ldots, f_T$) including a plurality of space resolution levels (K, ..., K−m, ..., K−M), wherein the plurality of space resolution levels are between a minimum resolution level (K−M) and a maximum resolution level (K),
   wherein estimating the motion field comprises:
   computing the motion field for each one of said space resolution levels by a minimization of a function,
   wherein, for each level which is different from the minimum space resolution level, said function comprises a regularization term including a constraint inherited by a space resolution level which is immediately lower than the level, wherein the constraint represents a difference between a low-pass component of a current motion field for the level and a previously computed motion field for the space resolution level which is immediately lower than the level.

2. The method according to claim 1, wherein said step of computing the motion field for every level different from the minimum space resolution level is performed sequentially passing from the minimum space resolution level to the maximum space resolution level.

3. The method according to claim 1, wherein, for each space resolution level, the motion field comprises an initial motion field ($p^0$) and an incremental motion field (q) and said step of computing the motion field (p) comprises computing the incremental motion field (q) and summing the incremental motion field (q) to the initial motion field ($p^0$).

4. The method according to claim 3, wherein, for a generic space resolution level with order K−m different from the minimum space resolution level, said regularization term between levels can be expressed as:

$$F_3(q_{K-m}) = \|E(q_{K-m} + p_{K-m}^0) - p_{K-m-1}\|^2,$$

where E is a filtering and sub-sampling operator, $p^0$ is the initial motion field and q is the incremental motion field, said incremental motion field q in a generic point with coordinates x, y being suitable to be expressed as $$q(x, y) = \begin{bmatrix} \delta u(x, y) \\ \delta v(x, y) \end{bmatrix},$$

wherein δu and δv are the horizontal and vertical components of the incremental motion field.

5. The method according to claim 4, wherein said filtering and sub-sampling operator E is a low-pass component of a wavelet transform.

6. The method according to claim 4 wherein, for each level different from the minimum space resolution level, said minimization can be expressed as $$q = \arg\min\{F_1(q) + \mu F_2(q) + \delta F_3(q)\}$$

where $F_1$ (q) is a term designating the approximation error, $F_2$ (q) is a term designating the motion field regularity and λ and μ are two regularization factors.

7. The method according to claim 6, wherein, for said minimum space resolution level, said minimization can be expressed as:

$$q = \arg\min\{F_1(q) + \lambda F_2(q)\}.$$

8. The method according to claim 6, wherein, taking into account two photograms $g_t$ and $g_{t+1}$ at following instants t and t+1 at the generic resolution level K−m, the term designating the approximation error can be expressed as:

$$F_1(q) = \|A_{K-m} q - (M(g_t, u_0, v_0) - g_{t+1})\|^2, \text{ where:}$$

$u_0$ and $v_0$ are the horizontal and vertical components of the initial motion field, $A_{k-m}$ is a matrix comprising two diagonal sub-matrixes containing space derivatives of photogram $g_{t+1}$, expressed as $A_{K-m} = [\text{diag}(g_{t+1}^{(x)}) \ \text{diag}(g_{t+1}^{(y)})]$, and M is a motion operator adapted to distort a generic photogram g in the following way:

$$M(g,u,v)(x,y) = g(x - u(x,y), y - v(x,y)).$$

9. The method according to claim 6, wherein the term designating the motion field regularity can be expressed as $F_2(q) = \|Hq\|^2$, where H is a second derivative operator which can be expressed as:

$$H = \begin{bmatrix} \frac{d^2}{dx^2} & \\ \frac{d^2}{dy^2} & \\ & \frac{d^2}{dx^2} \\ & \frac{d^2}{dy^2} \end{bmatrix}.$$

10. The method according to claim 1, comprising, before the steps of computing the motion fields, the further step of building photograms at different space resolution levels starting from photograms at maximum space resolution level.

11. The method according to claim 10, wherein, for each space resolution level, the step of building photograms comprises filtering and sub-sampling photograms at maximum space resolution level, said step of filtering and sub-sampling being performed a number of times equal to the number of levels separating the considered space resolution level from the maximum space resolution level.

12. The method according to claim 11, wherein the step of filtering and sub-sampling comprises the following steps:
low-pass filtering along the rows;
sub-sampling the columns;
low-pass filtering along the columns; and
sub-sampling the rows.

13. The method according to claim 1, wherein said function can be expressed through an optical flow equation.

14. The method for transmitting coded video images, comprising the steps of coding a video image according to the method of claim 1, transmitting the coded image, receiving the coded image and decoding the received coded image.

15. The method according to claim 14, wherein the step of decoding comprises applying to said coded video image at least one transform of the wavelet type for obtaining a sequence of photograms at a desired resolution level.

16. A non-transitory computer readable medium encoded with a computer program capable of being directly loaded in a memory of a data processing system and configured to implement, when executed, the method according to claim 1.

17. A system comprising a processor for performing the steps of the method according to claim 1.

* * * * *

UNITED STATES PATENT AND TRADEMARK OFFICE
CERTIFICATE OF CORRECTION

Page 1 of 1

| | |
|---|---|
| PATENT NO. | : 8,625,678 B2 |
| APPLICATION NO. | : 11/992741 |
| DATED | : January 7, 2014 |
| INVENTOR(S) | : Cordara et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1407 days.

Signed and Sealed this
Eleventh Day of August, 2015

Michelle K. Lee
*Director of the United States Patent and Trademark Office*